United States Patent [19]

Nicholson

[11] Patent Number: 4,753,443

[45] Date of Patent: Jun. 28, 1988

[54] COMPOSITE ANNULAR SEALS FOR ROTARY BALL VALVES AND BALL JOINTS

[75] Inventor: Terence P. Nicholson, County Durham, England

[73] Assignee: Heat Transfer Technology Limited, Jersey, Channel Islands

[21] Appl. No.: 88,372

[22] Filed: Aug. 24, 1987

[30] Foreign Application Priority Data

Aug. 22, 1986 [GB] United Kingdom ............... 8620489

[51] Int. Cl.$^4$ .......................... F16J 15/12; F16K 5/20
[52] U.S. Cl. ..................... 277/12; 277/166; 251/315
[58] Field of Search ............ 277/12, 32, 166; 251/314–316

[56] References Cited

U.S. PATENT DOCUMENTS

| | | | |
|---|---|---|---|
| 1,671,255 | 5/1928 | Porter | 251/314 X |
| 2,548,128 | 4/1951 | Snyder | 251/314 X |
| 3,401,914 | 9/1968 | Shand | 251/315 X |
| 3,522,930 | 8/1970 | Richards et al. | 251/315 |
| 4,593,916 | 6/1986 | Laulhe et al. | 277/12 |

FOREIGN PATENT DOCUMENTS

| | | | |
|---|---|---|---|
| 0067403 | 12/1982 | European Pat. Off. | 251/315 |
| 1188560 | 4/1970 | United Kingdom | 251/315 |

*Primary Examiner*—Robert S. Ward
*Attorney, Agent, or Firm*—Waldron & Associates

[57] ABSTRACT

A composite annular seal for a rotary ball valve or ball joint comprises a sealing ring (C) of low friction material intended to engage the ball (2), a first metal ring (A) of which part of one face is adapted resiliently to engage and conform with part of the surface of the sealing ring (C) while a radially more inward part of the face is adapted to engage and conform with the curvature of the ball (2), a second metal ring (B) which supports the first metal ring (A), having a radially outer part which overlaps the radially outer part of the sealing ring (C) and the radially outer part of the first metal ring (A) and of which a part is adapted to be in area contact with a part of the first metal ring (A), and a layer (D) of soft non-metallic material bonded to the axially outward surface of the second metal ring (B) for separating that part of the second metal ring (B) from the part of the housing (1) into which the seal is intended to be installed.

12 Claims, 3 Drawing Sheets

COMPOSITE ANNULAR SEALS FOR ROTARY BALL VALVES AND BALL JOINTS

This invention relates primarily to rotary ball valves for controlling the flow of fluids through pipes and bores, and more particularly to the provision of annular seals between the valve housing and the valve ball thereof. The invention is however also applicable to rotary ball joints.

Such seals are manufactured inter alia from low friction materials such as PTFE and although these have been extremely successful they have the disadvantage of low fire resistance and resulting disintegration of the low friction material. Attempts to protect the seals by the use of metal diaphragms and other expedients have however not met with much success.

In accordance with the present invention and with the general object of overcoming the above mentioned disadvantage there is proposed a composite annular seal for a rotary ball valve or ball joint comprising a sealing ring of low friction material adapted to engage the ball, a first metal ring of which part of one face is adapted to resiliently engage and conform with part of the surface of the sealing ring whilst a radially more inward part of the face is adapted to engage and conform with the curvature of the ball; a second metal ring, which radially outwardly supports the first metal ring, having a radially outer part which overlaps the radially outward part of the sealing ring and the radially outer part of said first metal ring and of which a diametric flat part is bonded to a layer of soft non-metallic material for separating that part of the second metal ring from the part of the housing into which the seal is intended to be installed.

The sealing ring may be of circular or other appropriate shape in radial cross-section and the first metal ring may be of more or less serpentine configuration in conformity with variations of radial cross-section of the sealing ring.

The areas of the first and second metal rings which are in contact may be varied but in general the ends of contacting parts will be welded together.

These and other features of the invention should however become more clearly apparent from the following description by reference to the accompanying drawings which illustrate various embodiments thereof.

Figure 1:
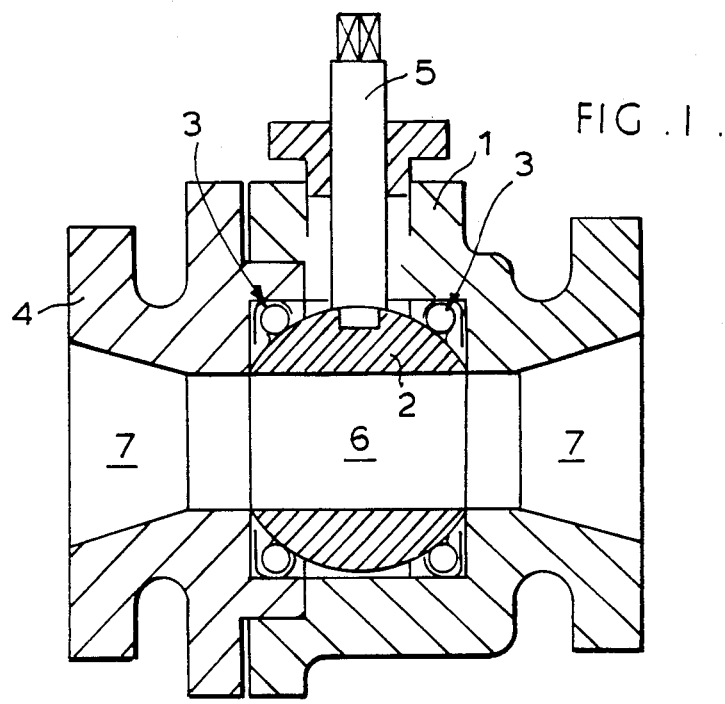
FIG. 1 is a longitudinal section through the flow axis of a typical example of a known rotary ball valve.

Referring now to the drawings, the known rotary ball valve illustrated in FIG. 1 consists of a main housing 1 with the valve ball 2 and the two annular seals 3 held in position by a left-hand component 4 which is either bolted to or screwed into the housing 1. The ball 2 can be turned by means of the attached shaft 5 between positions in which its central bore 6 is either aligned with, as shown, or at right angles, to co-axial fluid flow openings 7.

As shown in each of FIGS. 2 and 4 to 12 inclusive the composite annular sealing ring in accordance with the invention essentially comprises two pressed metal rings A and B, a sealing ring C made of PTFE or similar low friction material and a relatively thin ring D made of a soft resilient gasket material such as expanded graphite.

The first and second pressed metal rings A, B can be manufactured from a wide range of metals but it is preferred to use high nickel alloys since these have good welding qualities and age-hardening capabilities to enhance their resilient characteristics. Examples of such alloys are Nimonic 80A, Nimonic C263, Inconal 750 and Inconal 718.

In all embodiments the first metal ring A is of more or less serpentine radial cross-section, with part of one face resiliently engaging and conforming to part of the surface of the PTFE sealing ring C, and another part of that face radiused to match the radius of the ball. After heat treatment this latter radiused area, that is to say the seating area, is highly polished and preferably coated with one of the many low friction materials which are readily available in the industry. Two suitable examples are electroless nickel with a PTFE inclusion, which is then baked, and molybednum disulphide.

Figure 3:
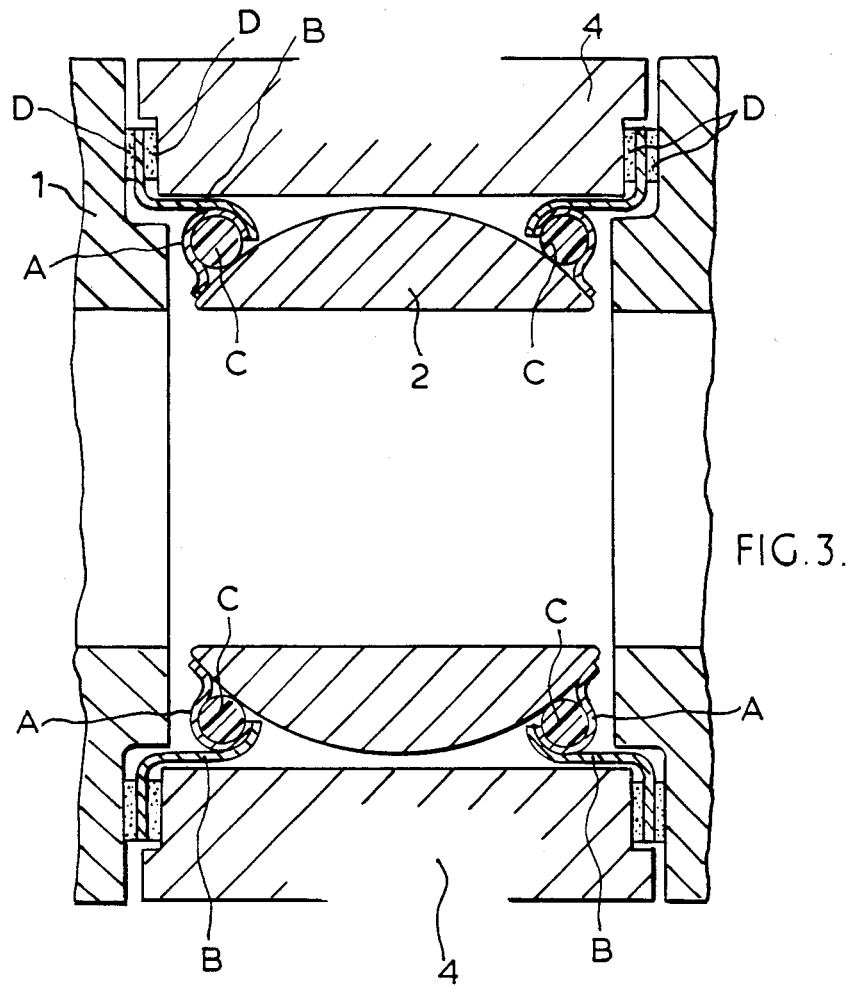
FIG. 3 is a view somewhat similar to FIG. 1, but in a plane perpendicular thereto, of a ball valve equipped with another form of composite annular seal in accordance with the invention.
Figure 4:
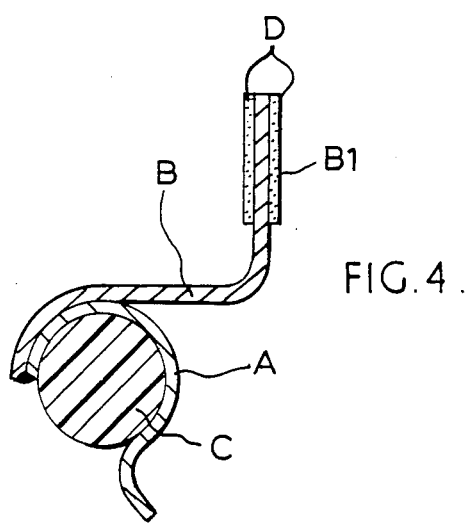
FIG. 4 is an enlarged scale radial cross-section of a seal as shown in FIG. 3.
Figure 5:
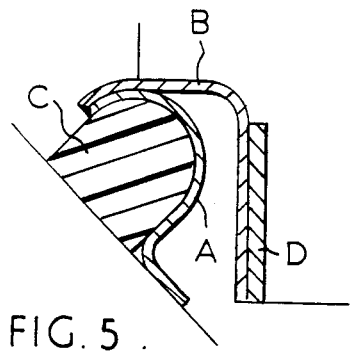
FIGS. 5 to 12 inclusive are enlarged scale radial cross-sectional views of 8 different composite annular seals according to the invention.
Figure 6:
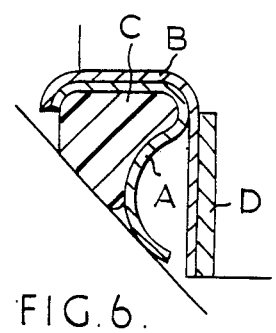
Figure 7:
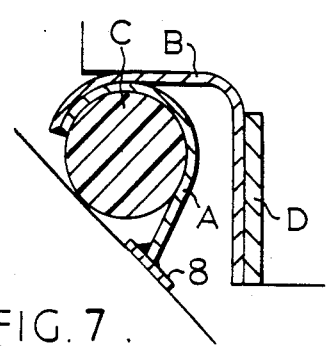

The second metal ring B is of somewhat L shaped radial cross-section and to its axially outward surface there is bonded the already mentioned ring D which separates part of the second metal ring from the adjacent part of the valve housing. However in the embodiment shown in FIGS. 3 and 4 there are two such soft resilient rings D bonded one to each of the axially outward and axially inward faces of a circumferential flat part or flange $B_1$ clamped between valve housing components 1 and 4.

Figure 8:
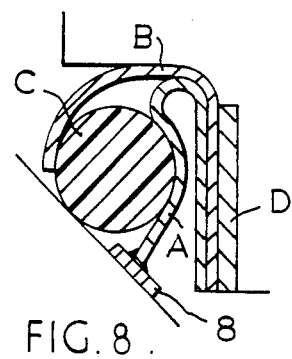

In those embodiments where a curved part of the metal ring B is intended to make area contact with the radially outward part of the other metal ring C, and is co-extensive therewith, that is to say in the embodiments shown in FIGS. 2 to 7 inclusive and 9 to 11 inclusive, those end edges of the rings are secured together by welding. Further, whereas in the embodiments shown in FIGS. 2 to 6 inclusive and FIGS. 9 and 10 the radially inner part of the ring A makes direct contact with the ball 2, in the embodiments shown in FIGS. 7, 8, 11 and 12 this contact is made by an extra element 8 secured thereto by welding or brazing. In all instances the final step in the manufacture of the composite annular seal is the pressing of the low friction material sealing ring C into the groove formed either by the metal ring A (FIGS. 2 to 7, 9, 10 and 11) or by the metal ring A in conjunction with the metal ring B (FIGS. 8 and 12). In all instances the dimensions of the composite annular seal are such that when the ball 2 and the two composite annular seals are clamped into operative position there is a slight interference fit to ensure that the seating areas of the metal rings A firmly engage the ring C and the ball 2 and that the soft material rings D are pressed firmly against the abutment surfaces of the housing. This is to ensure that an initial seal is established.

Figure 2:
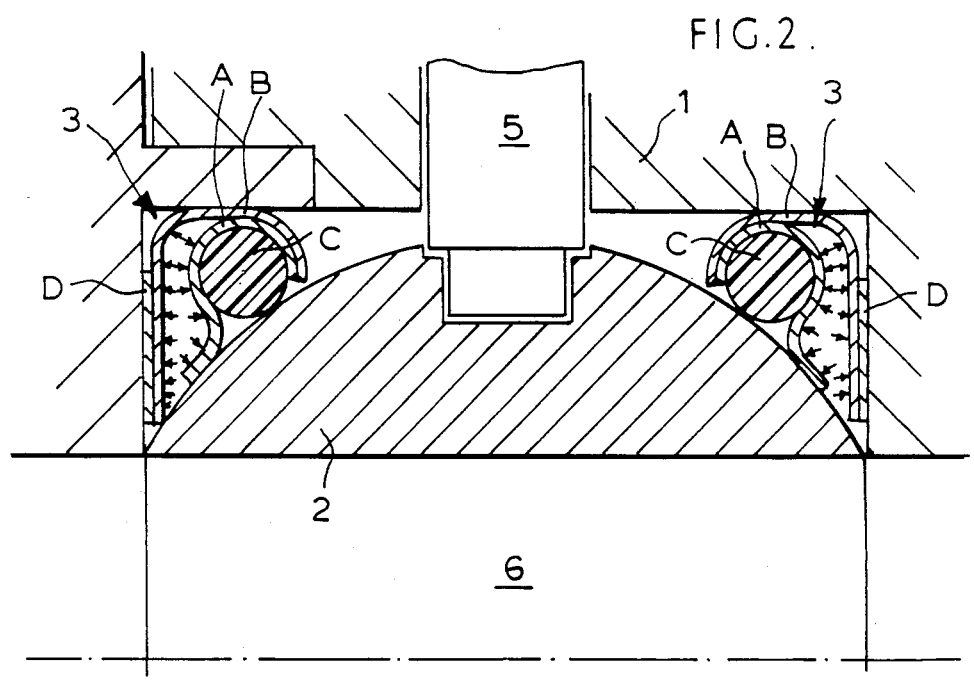
FIG. 2 is an enlargement of part of FIG. 1 to illustrate a composite annular seal in accordance with the invention.

When the system is pressurised, the pressurised medium in most of the embodiments flows inside the two metal rings A and B and exerts pressure as indicated by the arrows in FIG. 2. This tends to separate the two metal rings and presses them more firmly against the adjacent components.

The essential purpose of the sealing ring C is to ensure a perfect bubble type seal, even if, for some unforeseen reason, the seating area should be minutely scratched.

Should a fire occur in the vicinity of a valve fitted with seals as above described the self-energising properties of the metal rings alone would prevent any further fire hazard, even though the low friction sealing ring may have disintegrated.

Figure 9:
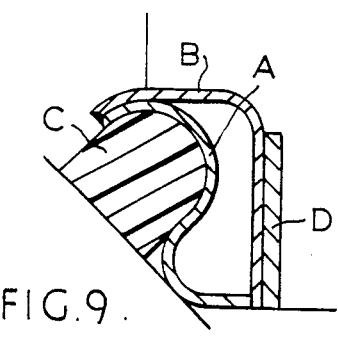
Figure 10:
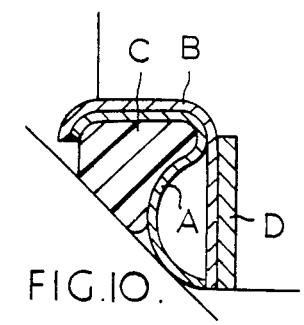
Figure 11:
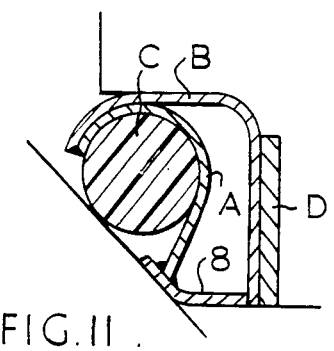
Figure 12:
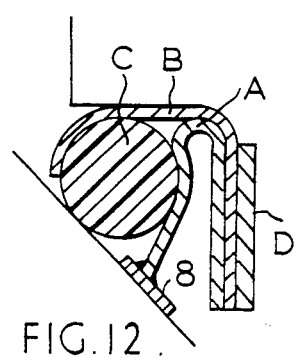

It may be noted that in the embodiments shown in FIGS. 6, 7, 8 and 12 the radially inner part of the first ring A does not make contact with the adjacent part of the metal backing ring B, whereas in FIGS. 9, 10 and 11 B is intended to meet ring A. This is to prevent foreign matter, such as slurry, sand, and so forth filling the space between the two metal rings which, if that were to happen, would seriously reduce the flexibility and high resilience of the composite annular seal as a whole.

I claim:

1. A composite annular seal for a rotary ball valve or ball joint comprising a sealing ring of low friction material intended to engage the ball, a first metal ring of which part of one face is adapted resiliently to engage and conform with part of the surface of the sealing ring whilst a radially more inward part of the face is adapted to engage and conform with the curvature of the ball, a second metal ring which radially outwardly supports the first metal ring, having a radially outer part which overlaps the radially outer part of the sealing ring and the radially outer part of the first metal ring and of which a diametric flat part is bonded to a layer of soft non-metallic material for separating that part of the second metal ring from the part of the housing into which the seal is intended to be installed.

2. A composite annular seal in accordance with claim 1 in which the flat part of the second metal ring extends in a diametic plane opposite the radially inward part of the first metal ring and has a said layer of soft non-metallic material bonded to its outward side.

3. A composite annular seal in accordance with claim 1 in which the flat part of the second metal ring extends radially outwards in a diametric plane away from the first metal ring and has a said layer of soft non-metallic material bonded to each of its sides.

4. A composite annular seal in accordance with claim 1 in which curved extremities of the first and second metal sealing rings are co-extensive and welded together.

5. A composite annular seal in accordance with claim 1, in which the radially inner extremity of the first metal ring is spaced away from an adjacent opposite surface of the second metal ring.

6. A composite annular seal in accordance with claim 1, in which the radially inner extremity of the first metal ring extends into contact with the adjacent opposite surface of the second metal ring.

7. A composite annular seal as set forth in claim 1 in which the said radially more inward part of the first metal ring is constituted by an extension piece welded thereto and matching the curvature of the ball.

8. A composite annular seal in accordance with claim 1 in which the sealing ring is made of PTFE.

9. A composite annular seal in accordance with claim 1 in which the metal rings are made of an alloy with a high nickel content.

10. A composite annular seal in accordance with claim 1 wherein at least the part of the first metal ring, or its extension piece, which is adapted to engage the ball is highly polished and coated with a low friction co-efficient material.

11. A composite annular seal as claimed in claim 10 wherein the low friction co-efficient material is electro-less nickel with a PTFE inclusion, which is subsequently baked, or molybdenum disulphide.

12. A composite annular seal as claimed in claim 1 in which the ring of soft resilient material is made of expanded graphite.

* * * * *